United States Patent Office 3,117,112
Patented Jan. 7, 1964

3,117,112
POLYMERIZATION PROCESS USING CO-CATALYST OF ALUMINUM ALKYL COMPOUND AND OXYGEN
Frank A. Mirabile, Silver Spring, and Frank X. Werber, Rockville, Md., assignors to W. R. Grace & Co., New York, N.Y., a corporation of Connecticut
No Drawing. Filed Apr. 7, 1961, Ser. No. 101,328
9 Claims. (Cl. 260—88.7)

This invention relates a novel polymerization process. More particularly it is directed to the polymerization of vinylidene monomers which contain a $CH_2=C<$ group in the molecule i.e. compounds which contain a vinyl or vinylidene radical in the molecule. In this group, there is generally a substituent, thus

in which R is, typically, H or a lower alkyl (i.e. 1 to 8 carbon atoms). However, R can also be an aliphatic group, e.g. an itaconic acid residue:

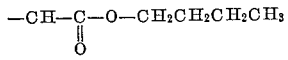

Summarily, this invention is concerned with polymerization of vinylidene monomers containing $CH_2=C<$ group particularly members of the group consisting of vinyl esters, esters of α-alkylacrylic acids esters of acrylic acid, nitriles of the formula

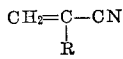

in which R is hydrogen or an alkyl containing 1 to 8 carbon atoms, 6 membered carbocyclic compounds containing 1 to 3 ethylenically unsaturated groups of the formula:

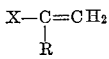

in which X is a radical selected from the group consisting of phenyl, cyclohexadienyl-1,3, cyclohexadienyl-1,4, and cyclohexenyl and R is hydrogen or an alkyl containing 1 to 8 carbon atoms, a vinyl ether of the formula $R—O—CH=CH_2$ in which R is an alkyl, haloalkyl, or alkoxyalkalene, the alkyl and alkylene groups containing 1 to 8 carbon atoms and a conjugated diene of the formula:

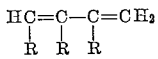

in which R is hydrogen or an alkyl containing 1 to 8 carbon atoms by subjecting a group member, preferably in the presence of an insert solvent, to the action of a catalyst consisting essentially of an aluminum alkyl and oxygen at low temperatures.

This application is a continuation-in-part of our application having Serial No. 768,835, now abandoned.

The use of aluminum alkyls in recent years for polymerizing olefin monomers is well known in the art. See U.S. 2,699,457, issued to Ziegler et al. The effectiveness of aluminum alkyls and oxygen as a catalyst to polymerize the aforesaid, vinylidene monomers containing the $CH_2=C<$ group is surprising in view of the fact that oxygen containing impurities, e.g., moisture, air, carbon dioxide are well known poisons for aluminum alkyls in the polymerization of ethylene and propylene. See for example, U.S. 2,781,410, issued to Ziegler et al. Moreover, it is remarkable that a catalyst formed by the addition of oxygen to an aluminum alkyl will polymerize the monomers (e.g., vinyl acetate) of the instant invention in view of the fact that polymerization of monomers such as vinyl acetate has not been accomplished with the addition of Ziegler catalyst. See Linear and Stereoregular Addition Polymers, Gaylord and Mark, p. 298, Interscience Publishers, 1959. In addition, it is even more surprising that not only does the oxygen fail to have a poisonous effect on the aluminum alkyl compound in the polymerization of the aforementioned vinylidene monomers containing the $CH_2=C<$ group, but instead has a synergistic effect when combined with the aluminum alkyl resulting in an increased polymer yield over and above the yield obtained when the catalyst is oxygen or an aluminum alkyl per se, as will be shown hereinafter.

The reason for the synergistic effect of the catalyst components is not known. Results indicate that the catalyst components should preferably be added to the monomer at low temperatures in order to obtain optimum polymer yields. For any given polymerization reaction temperatures, an initially lower temperature for the catalyst addition step will result in higher polymer yields in comparison to the catalyst addition and the polymerization reaction being performed at the same temperature. Preferably, the catalyst addition step is carried out at a temperature below 0° C.; the lower limit being the freezing point of the monomer or monomer solution to be polymerized. The temperature of the polymerization step at atmospheric pressure is limited by the component having the lowest boiling point. Obviously, higher temperatures can be employed if superatmospheric pressure is used. The polymerization step is ordinarily performed at a temperature in the range from minus 80 to plus 80° C. The fact that the catalyst system of the instant invention is effective under such a broad range of temperature is surprising. The customary free radical type initiators (peroxides such as benzoyl peroxides, azo nitriles such as azo isobutyronitrile, redox catalyst combinations such as cumene hydroperoxide with ferrous salts, and many others) are only effective at temperatures above 0–5° C. Only a few chemical initiating systems are known which polymerize the common vinylidene monomers containing the $CH_2=C<$ group down to minus 20° C. and then very slowly. Only cationic Friedel-Crafts type initiators such as aluminum chloride, boron trifluoride and the like are known to polymerize any monomers at temperatures as low as minus 80° C. Their action is restricted to substituted alkenes, such as isobutylene; however, they do not polymerize monomers such as methylmethacrylate or vinyl acetate.

Low temperature polymerization affords many beneficial results including higher molecular weight polymer. Due to less chain transfer at low temperatures, polymers are less branched and therefore possess a higher degree of crystallinity (resulting in a higher softening point). Frequently, also, monomers will tend to add to the growing chain at low temperature, in the sterically preferred configuration, leading to stereoregular polymers. Such polymers are usually highly crystalline, even when the corresponding randomly polymerized material is amorphous.

We have not ascertained the mechanism of this novel polymerization, i.e., whether it is free radical, ionic, or a combination thereof, nor do we wish to be bound by any theory. Suffice it to say that polymerization of each of the aforesaid monomers occurs in the presence of a catalyst comprising an aluminum alkyl and oxygen under conditions explained more fully hereinafter.

The following examples will aid in explaining, but should in no way limit the invention.

Where the degree of polymerization is given in the following examples it was obtained by the method as shown in J. Polymer Science, 28, 487–489 (1958).

EXAMPLE 1

A three-neck flask equipped with thermometer well, dropping funnel, condenser and gas-inlet tube (for oxygen) was flushed with nitrogen and charged with 0.1 mole of vinyl acetate along with 0.01 mole of aluminum triisobutyl. Oxygen was bubbled into the liquid at the rate of about 100 cc./minute for about 2 minutes. About 0.01 mole $O_2$ was passed into the liquid. Thereafter agitation by means of a magnetic stirrer was commenced and the system was again flushed with nitrogen and maintained under a slight nitrogen pressure ("nitrogen blanket") during the run. (The "nitrogen blanket" is not absolutely essential, but facilitates control in the amount of oxygen made available to the system.) The temperature rose quickly from room temperature (25° C.) to 70° C. The polymerization was stopped after 1 hour resulting in a tacky mass of polyvinylacetate which was soluble in benzene.

EXAMPLE 2

Using the equipment stated in Example 1, 0.21 mole of vinyl acetate and 0.2 mole of n-heptane were charged to the flask. 5 cc. (0.020 mole) of aluminum triisobutyl and 440 cc. (about 0.02 mole) oxygen were added to the vinyl acetate solution at room temperature, following the procedure of Example 1. Agitation was started, the system was swept out by nitrogen, and within one minute the temperature increased to 70° C. After 4½ hours the run was discontinued and the mixture transferred to a beaker containing 500 ml. of heptane. The solid product was filtered, dried, and weighed. 6.2 g. of polymer equal to 34% conversion of the vinyl acetate charged was obtained. The degree of polymerizataion was 179.

EXAMPLE 3

The reaction apparatus used in Examples 1 and 2 was immersed in a Dry Ice-isopropanol bath to maintain a reaction temperature of −40° C. throughout the run. 0.1 mole of vinyl acetate was charged to the flask containing 147 cc. of n-heptane. Additionally, 0.10 mole each of aluminum triisobutyl and oxygen were added to the solution of vinyl acetate as in the preceding examples. Agitation was initiated and after about one minute the system was swept with nitrogen. The reaction was continued for 4½ hours under nitrogen with the temperature holding at −40° C. The run was stopped and the solid polymer product was filtered free from solution, dissolved in benzene, and the benzene solution filtered. The resulting filtrate was stripped of benzene and upon drying 2.5 g. of polymer were obtained having a value of 180 for its degree of polymerization.

The following two examples (comparable to Example 1) were made to ascertain the necessity of using an aluminum alkyl in combination with oxygen.

EXAMPLE 4

Using the equipment and technique of Example 1 except that no oxygen was added to the reaction flask, 0.32 mole of vinyl acetate and 0.032 mole of aluminum triisobutyl were charged under nitrogen to the reaction flask. After a 5-hour run at 25° C. with agitation, no formation of polymer was noted.

EXAMPLE 5

Using the equipment and following the procedure of Example 1 except that no aluminum triisobutyl was introduced to the system, 0.21 mole of vinyl acetate was charged under nitrogen to the reaction flask. Agitation was commenced and 220 cc. (about 0.01 mole) oxygen was introduced through the gas-inlet tube. After sweeping the system with nitrogen, a 4-hour run was started. No formataion of polymer was ascertained at the end of this period.

EXAMPLE 6

Using the same equipment as in Example 3 with a Dry Ice-isopropanol bath to maintain a temperature of −80° C., 10 g. methylmethacrylate (.1 mole) was dissolved in 1 mole of n-heptane and charged to the reaction flask under a stream of nitrogen. Agitation was commenced, and 2.5 cc. aluminum triisobutyl (.010 mole) was added dropwise to the flask as 220 cc. (about 0.01 mole) oxygen was introduced through the gas-inlet tube. The introduction of the aluminum triisobutyl caused the reaction mixture to turn green; subsequently with the passage of oxygen through the mixture for about two minutes, it became colorless. A 4-hour run under nitrogen was started. Throughout the run the temperature was maintained at −80° C. At the end of the 4-hour period the reaction mixture was poured into 1000 ml. of methanol, and thereafter the solids were filtered free of the solution. Upon drying and weighing, 2 g. of solid polymer soluble in benzene was obtained. The yield was equal to a 20% conversion of the methylmethacrylate charged.

EXAMPLE 7

Using the same equipment and procedure as in Example 6, under a stream of nitrogen 11 cc. of styrene (9.9 g.; .096 mole) dissolved in 1.0 mole of n-heptane were added to the cooled flask (−80° C.) along with 2.5 cc. aluminum triisobutyl and (.010 mole) oxygen. The system was swept with nitrogen, and a 4-hour run at −80° C. with agitation commenced. The reaction mixture thereafter was poured into 1000 ml. of methanol and filtered. After drying, 2 g. of polymer product (19% conversion of the styrene charged) was obtained. For characterization the polymer product was dissolved in toluene and reprecipitated with methanol.

EXAMPLE 8

A three-necked flask equipped with thermometer well, dropping funnel, condenser, and gas-inlet tube was flushed with nitrogen and charged with 0.116 mole vinyl acetate along with 0.505 millimole of triisobutyl aluminum. 0.0625 millimole oxygen was bubbled into the flask. Agitation by means of a magnetic stirrer was commenced and the system was maintained at room temperature under a nitrogen blanket during the run. The nitrogen blanket is not absolutely essential, but facilitates control in the amount of oxygen made available to the system. After one hour, the polymerization was stopped and a polyvinyl acetate product in the form of a tacky mass was obtained. The product was soluble in benzene.

EXAMPLE 9

The procedure of Example 8 was followed excepting that 0.088 mole of vinyl butyrate was substituted for the 0.116 mole of vinyl acetate. The solid polyvinyl butyrate product was soluble in benzene.

EXAMPLE 10

The procedure of Example 8 was followed excepting that 0.10 mole of vinyl propionate was substituted for the 0.116 mole vinyl acetate. The solid polyvinyl propionate product was soluble in benzene.

EXAMPLE 11

The procedure of Example 8 was followed excepting that 0.032 mole vinyl oleate was substituted for the 0.116 mole vinyl acetate. The solid polyvinyl oleate product was soluble in benzene.

EXAMPLE 12

The procedure for Example 8 was followed excepting that 0.054 mole of vinyl-2-ethyl hexoate was substituted for the 0.116 mole of vinyl acetate. The solid polymer product was recovered in good yield from petroleum ether.

EXAMPLE 13

The procedure of Example 8 was followed excepting that 0.047 mole vinyl isodecanoate was substituted for the 0.116 mole of vinyl acetate. The solid polymer product was recovered from petroleum ether.

The above examples, i.e., 8 through 13 were repeated using 0.273 mole of trioctyl aluminum as a catalyst in place of triisobutyl aluminum. The results show that polymerization yields within the same polymerization period were comparable.

Examples 8 through 13 were repeated using 0.875 mole of triethyl aluminum as the catalyst instead of triisobutyl aluminum. The polymerization yields obtained with triethyl aluminum were comparable to those obtained when triisobutyl aluminum was employed.

EXAMPLE 14

Using the same equipment as in Example 8, 0.116 mole of methyl acrylate were charged along with 0.505 millimole of triisobutyl aluminum to the three-necked flask. 0.0625 millimole of oxygen were bubbled into the flask after purging with nitrogen. The flask was agitated for one hour during which time the reaction temperature increased from room temperature up to about 40° C. The solid polymethyl acrylate product was precipitated out in acetone in good yield.

EXAMPLE 15

The procedure of Example 14 was followed except that 0.10 mole of ethyl acrylate was substituted for the 0.116 mole of methyl acrylate. After 15 minutes a glassy solid was obtained. The run was continued for three hours at which time solid polymethylacrylate was precipitated out in acetone.

EXAMPLE 16

The procedure of Example 14 was followed excepting that 0.078 mole n-butyl acrylate was substituted for the 0.116 mole of methyl acrylate. After 15 minutes the liquid became very viscous. A solid n-butylacrylate polymer product which precipitated out in acetone was obtained after a 10 hour polymerization period.

EXAMPLE 17

Example 16 was repeated except that 0.875 millimole of triethyl aluminum was substituted for 0.505 millimole of triisobutyl aluminum. After a 24-hour polymerization period, a glassy solid n-butylacrylate polymer which precipitated out of acetone was obtained.

EXAMPLE 18

To a 12 oz. Pyrex polymerization bottle filled with dry nitrogen was added 10 ccs. dry n-heptane and 18.4 grams of 2-ethyl hexyl acrylate. The bottle was capped with a puncturable neoprene rubber disc and a metal cap containing a hole in the center thereof large enough to admit a syringe needle. After capping, the bottle was chilled to minus 20° C. and 4.52 millimoles of oxygen and 4.52 millimoles of triisobutyl aluminum was added thereto with a syringe needle. The bottle was placed in a Dry Ice bath (minus 6° C.) in a light-proof vibrating container wherein it was mechanically shaken for 4 hours. The Dry Ice bath was removed and shaking was continued for an additional 20 hours. The container was then opened and the contents of the bottle were worked up in the following manner. The contents of the bottle were dissolved in 50 ml. of methanol to precipitate the polymer product. The solid polymer was filtered out and dried at 50° C. and 30 mm. Hg pressure, overnight. The dried solid ethyl hexyl acrylate polymer weighed 6.9 grams, thus resulting in a 37% conversion of the monomer reactant.

EXAMPLE 19

A three-necked flask equipped with thermometer well, dropping funnel, condenser, and gas-inlet tube for oxygen, was flushed with nitrogen and charged with 0.088 mole ethyl methacrylate and 0.875 millimole of triethyl aluminum. Oxygen was bubbled into the liquid until 0.0625 millimole of oxygen were present in the flask. After agitating at room temperature for 60 minutes a solid polyethyl methacrylate product was obtained in good yield.

EXAMPLE 20

Example 19 was repeated substituting 0.505 millimole triisobutyl aluminum for 0.875 millimole of triethyl aluminum. Solid polyethyl methacrylate was obtained at room temperature after one-half hour.

EXAMPLE 21

Procedure of Example 19 was followed except that 0.275 millimole of trioctyl aluminum was substituted for 0.875 millimole of triethyl aluminum. After 30 minutes' agitation at room temperature a solid polyethyl methacrylate product was formed.

EXAMPLE 22

The procedure of Example 19 was followed except that 0.059 mole of hexyl methacrylate was substituted for the ethyl methacrylate. After agitating at room temperature for 24 hours solid polyhexyl methacrylate was obtained in good yield.

EXAMPLE 23

Example 22 was repeated using 0.273 millimole of trioctyl aluminum in place of the triethyl aluminum. After 24-hours at room temperature, a solid polymer product was obtained.

EXAMPLE 24

Example 22 was repeated using 0.505 millimole of triisobutyl aluminum in place of triethyl aluminum. After 4 hours at room temperature with agitation solid polyhexyl methacrylate was obtained.

EXAMPLE 25

The procedure of Example 19 was followed excepting that 0.07 mole of n-butyl methacrylate was substituted for 0.088 mole ethyl methacrylate. After agitating at room temperature for 24 hours a solid polymer of n-butyl methacrylate was obtained.

EXAMPLE 26

The procedure of Example 25 was followed excepting that 0.273 millimole of trioctyl aluminum were substituted for 0.875 millimole triethyl aluminum. After 24 hours a solid polymer product was obtained.

EXAMPLE 27

The procedure of Example 19 was followed except that 0.029 mole of octadecyl methacrylate was substituted for the 0.088 mole ethyl methacrylate. After agitating at room temperature for 24 hours a viscous solution was obtained. A solid polyoctadecyl methacrylate polymer was precipitated from the solution on the addition of acetone. This run was repeated using 0.505 millimole of triisobutyl aluminum and under the same conditions a solid octadecyl methacrylate polymer was recovered after a 20-hour run.

EXAMPLE 28

The procedure of Example 19 was followed except that 0.039 mole of lauryl methacrylate was substituted for 0.088 mole of ethyl methacrylate, and 0.273 millimole of trioctyl aluminum was substituted for the 0.875 millimole of triethyl aluminum. After agitating at room temperature for 24 hours, a solid lauryl methacrylate polymer in good yield was recovered upon the addition of acetone. This run was repeated using 0.505 millimole of triisobutyl aluminum in place of the 0.273 millimole of trioctyl aluminum. After agitating at room temperature for 20 hours, a solid polymer product was recovered from acetone.

EXAMPLE 29

The procedure of Example 19 was followed except that 0.041 mole of di-n-butyl itaconate was substituted for the 0.088 mole of ethyl methacrylate. After 48 hours a solid di-n-butyl itaconate polymer was recovered as a precipitate upon the addition of acetone.

EXAMPLE 30

A three-necked flask equipped with thermometer well, dropping funnel, condenser, and gas-inlet tube was flushed with nitrogen and charged with 0.043 mole of ethylene glycol dimethacrylate, and 0.0875 millimole of triethyl aluminum. The flask was purged with nitrogen followed by the addition of 0.0625 millimole of oxygen to the flask. After a 15-minute agitation period at room temperature, a solid ethylene glycol dimethacrylate polymer product was obtained. A solid polymer product was also obtained when triisobutyl aluminum and trioctyl aluminum were substituted in respective runs for the triethyl aluminum.

EXAMPLE 31

The procedure of Example 30 was followed except that 0.063 mole of dimethyl aminoethylmethacrylate was substituted for ethylene glycol dimethacrylate. After agitating at room temperature for 7 minutes, a solid polymer product was obtained.

EXAMPLE 32

The procedure of Example 30 was followed except that 0.147 mole of isoprene was substituted for the ethylene glycol dimethacrylate. After 24 hours of agitation at room temperature a solid isoprene polymer product was obtained. The product was recovered by precipitating it out in acetone. This example was repeated using 0.505 millimole of triisobutyl-aluminum and 0.273 millimole of trioctyl aluminum respectively. In both runs a solid polymer product was obtained.

EXAMPLE 33

The procedure of Example 30 was followed excepting that 0.147 mole of pentadiene-1,3 was substituted for the 0.043 mole of ethylene glycol dimethacrylate. After a 24-hour agitation period at room temperature, a solid pentadiene-1,3 polymer product recoverable as a precipitate from acetone was obtained. This run was repeated using 0.273 millimole of trioctyl aluminum and 0.050 millimole of triisobutyl aluminum respectively. In both runs a solid polymer product was obtained.

EXAMPLE 34

A three-necked flask equipped with thermometer well, dropping funnel, condenser and gas-inlet tube was flushed with nitrogen and charged with 0.188 mole of acrylonitrile, and 0.505 millimole of triisobutylaluminum. Oxygen was bubbled into the flask until 0.0625 millimole of oxygen were present therein. The solution was agitated by means of a mechanical stirrer for 24 hours at room temperature. Solid acrylonitrile polymer was obtained. The polymer was washed with 1% aqueous HCl solution to remove unreacted monomer and catalyst residue.

EXAMPLE 35

Example 34 was repeated except that 0.15 mole of methacrylonitrile was substituted for the acrylonitrile. After agitating at room temperature for 24 hours a solid methacrylonitrile polymer product was obtained. This example was repeated using 0.875 millimole of triethylaluminum and 0.273 millimole of trioctyl aluminum respectively. In both instances, a solid polymer product was obtained after 24 hours.

EXAMPLE 36

A three-necked flask equipped with thermometer well, dropping funnel, condenser and gas-inlet tube was flushed with nitrogen and charged with 0.096 mole of styrene and 0.505 millimole of triisobutylaluminum. Oxygen was added until 0.0625 millimole were present in the flask. After agitating at room temperature for 24 hours, a solid polystyrene product was obtained. This example was twice repeated using 0.875 millimole of triethyl aluminum and 0.273 millimole of trioctyl aluminum respectively. In both runs solid polystyrene was obtained.

EXAMPLE 37

Example 36 was repeated except that 0.085 mole of $\alpha$-methyl styrene was substituted for styrene. After 24 hours at room temperature and mechanical agitation a solid $\alpha$-methyl styrene polymer product was obtained. The run was twice repeated using triethylaluminum and trioctyl aluminum. In both instances a solid polymer product was obtained.

EXAMPLE 38

Example 36 was repeated except that 0.092 mole of vinyl cyclohexene-1 was substituted for styrene. After 24 hours with agitation at room temperature, a solid vinyl cyclohexene-1 polymer product was obtained. The run was twice repeated using triethyl aluminum and trioctyl aluminum. In both instances solid polymer product was obtained.

EXAMPLE 39

A three-necked flask, equipped with thermometer well, dropping funnel, condenser and gas-inlet tube was flushed with nitrogen and charged with 0.094 mole of vinyl-2-chloroethyl ether and 0.505 millimole of triisobutylaluminum. 0.0625 millimole of oxygen were added to the flask and agitation was commenced. After 24 hours, a solid vinyl-2-chloroethyl ether polymer product was obtained. This run was repeated using 0.875 millimole of triethyl aluminum in place of the triisobutylaluminum. A solid polymer product was obtained.

EXAMPLE 40

The procedure of Example 39 was followed except that 0.098 mole of vinyl-2-methoxyethyl ether was substituted for the vinyl-2-chloro-ethyl ether. After agitating at room temperature for 24 hours, solid vinyl-2-methoxyethyl ether polymer was obtained. A repeat of this run using 0.273 millimole of trioctyl aluminum resulted in a solid polymer product after 24 hours at room temperature.

The following examples show the operability of the dialkyl aluminum hydrides as catalyst in the instant invention.

EXAMPLE 41

A three-necked 250 ml. flask equipped with thermometer well, dropping funnel, condenser and gas-inlet tube was charged with 1.17 g. methyl acrylate and 0.1825 g. of diisobutyl aluminum hydride in n-heptane. Air blanketed the reactants in the flask. Agitation was initiated and the reaction was run for 30 minutes. An HCl-methanol wash was added to the flask to dissolve the catalyst. The solid polymer product was filtered free of the solution and rewashed with methanol followed by a water wash. The solid polymer product, after drying overnight, weighed 0.2646 g. equal to a 22.6% conversion of the methyl acrylate monomer reactant.

EXAMPLE 42

1.43 grams of ethyl acrylate and 0.195 grams of diisobutyl aluminum hydride in n-heptane were charged to a 250 mm. flask and reacted as per the procedure of Example 41. The dried polymer product weighed 0.5894 gram equal to a 41.2% conversion of the monomer.

EXAMPLE 43

1.68 grams of butylacrylate and 0.1785 gram of diisobutyl aluminum hydride in n-heptane were reacted as per the procedure of Example 41. The solid polymer product weighed .7933 gram, equal to a 47.2% conversion of the monomer reactant.

EXAMPLE 44

1.57 grams of 2-ethyl hexyl acrylate and 0.8093 gram of diisobutyl aluminum hydride in n-heptane were reacted as per the procedure of Example 41. The solid polymer product weighed .8093 gram equal to a 51.5% conversion of the monomer reactant.

EXAMPLE 45

3.06 grams of tridecylacrylate and .163 gram of diisobutyl aluminum hydride in n-heptane were reacted according to the procedure of Example 41. The dried polymer product weighed 1.9765 grams equal to a 64.6% conversion of the monomer reactant.

EXAMPLE 46

1.089 grams of methyl methacrylate and 0.147 gram of diisobutyl aluminum hydride in n-heptane were reacted as in Example 41. The dried polymer product weighed .1421 gram, equal to a 13% conversion of the monomer reactant.

EXAMPLE 47

1.37 grams of ethyl methacrylate and .1623 gram of diisobutyl aluminum hydride in n-heptane were reacted as in Example 41. The dried polymer product weighed .186 gram equal to a 13.6% conversion of the monomer reactant.

EXAMPLE 48

1.47 grams of butyl methacrylate and a .140 gram of diisobutyl aluminum hydride in n-heptane were reacted as in Example 41. The dried polymer product weighed .1754 gram equal to an 11.9% conversion of the monomer reactant.

EXAMPLE 49

1.84 grams of hexyl methacrylate and .147 gram of diisobutyl aluminum hydride in n-heptane were reacted as in Example 41. The dried solid polymer product weighed .2026 gram equal to an 11.0% conversion of the monomer reactant.

EXAMPLE 50

1.69 grams of lauryl methacrylate and 0.090 gram of diisobutyl aluminum hydride in n-heptane were reacted as in Example 41. The dried polymer product weighed 1.3923 grams, equal to an 82.4% conversion of the monomer reactant.

EXAMPLE 51

2.12 grams of dimethylaminoethyl methacrylate and 0.182 gram of diisobutyl aluminum hydride in n-heptane were reacted as in Example 41. The solid polymer product weighed .3255 gram, equal to a 15.3% conversion of the monomer reacted.

The reactions in the following tables were performed in a controlled atmosphere consisting of nitrogen and oxygen in various ratios. The monomer reactant was 9 cc. of vinyl propionate in all examples in Table I and 1 cc. vinyl propionate containing 10% polyvinyl acetate in Table II.

*Table I*

| Example No. | Catalyst Triethyl Aluminum (moles) | Catalyst Oxygen (moles) | Mole Ratio, Oxygen:Triethyl Aluminum | Percent Conversion of Monomer to Polymer |
|---|---|---|---|---|
| 52 | 0.0018 | 0.00262 | 1:0.69 | 6.0 |
| 53 | 0.0018 | 0.00221 | 1:0.81 | 8.6 |
| 54 | 0.0018 | 0.00144 | 1:1.24 | 17.0 |
| 55 | 0.0018 | 0.00097 | 1:1.85 | 23.4 |
| 56 | 0.0018 | 0.00053 | 1:3.4 | 24.4 |
| 57 | 0.0018 | 0.00048 | 1:3.75 | 24.6 |
| 58 | 0.0018 | 0.00009 | 1:20 | 28.3 |

*Table II*

EFFECT OF PERCENT $O_2$ IN NITROGEN ON PERCENT CONVERSION OF VINYL PROPIONATE CONTAINING 10% POLYVINYL ACETATE

| Example No. | Catalyst (0.144 mm./cc. monomer) | Percent $O_2$ in Nitrogen | Percent Conversion | Remarks |
|---|---|---|---|---|
| 59 | Triisobutylaluminum | 3 | 32.2 | |
| 60 | ...do... | 5 | 15.5 | |
| 61 | ...do... | 10 | 10.4 | |
| 62 | ...do... | 15 | 9.8 | |
| 63 | ...do... | 20 | 11.6 | |
| 64 | ...do... | 20 | 11.1 | open air. |
| 65 | Diisobutyl Aluminum Hydride | 1 | 38.4 | |
| 66 | ...do... | 3 | 35.3 | |
| 67 | ...do... | 5 | 28.0 | |
| 68 | ...do... | 10 | 22.4 | |
| 69 | ...do... | 15 | 20.8 | |
| 70 | ...do... | 20 | 17.5 | |
| 71 | ...do... | 20 | 17.6 | open air. |

The ratio of aluminum alkyl to oxygen is not critical. The invention is operable within a broad range of aluminum alkyl:oxygen mole ratios. A mole ratio range of aluminum alkyl:oxygen of 0.0001 to 10,000:1 is operable. A preferred range is 0.001 to 100:1 respectively.

By the term "aluminum alkyl" as used throughout this invention is meant a compound having the general formula:

wherein R is an alkyl or hydrogen and R' is an alkyl, all of said alkyl groups containing 1 to 8 carbon atoms.

The polymerization reaction of the instant invention is ordinarily performed at atmospheric pressure. However, the reaction is operable at subatmospheric or superatmospheric pressures.

EXAMPLE 72

A 375 cc. Pyrex polymerization bottle was flushed with nitrogen and capped with a puncturable neoprene rubber disc and a metal cap containing a hole in its center large enough to admit a hypodermic syringe needle. After capping the bottle was evacuated to 30 mm. Hg. 25 cc. of vinyl acetate was added to the polymerization bottle followed by the addition of 2.34 cc. of commercial grade triisobutyl aluminum (8.8 millimoles) by means of a hypodermic syringe. The polymerization bottle was then pressured with oxygen until 21.5 millimoles of oxygen were present in the bottle. The bottle was manually shaken for 5 minutes at which time a solid orange product was visibly present. The product was worked up by dissolving it in an isopropanol-glacial acetic acid solution and precipitating it with water. The final polyvinylacetate product was white and after drying, weighed 2.5 g. equal to a 10.6% conversion of the monomer reactant.

EXAMPLE 73

The polymerization procedure of Example 72 was followed except that 46.5 millimoles of oxygen were added to the bottle. After 2 minutes' manual shaking, a solid orange product was present. The product was washed free of unreacted monomer with petroleum ether and dried overnight. The dried polyvinylacetate product weighed 0.3086 g. equal to a 3.8% conversion of the monomer reactant.

EXAMPLE 74

The polymerization procedure of Example 72 was followed except that 25 cc. of vinyl butyrate replaced the vinyl acetate and 57.0 millimoles of oxygen were added along with the 8.8 millimoles of commercial grade triisobutyl aluminum. After 2 minutes an orange gelatinous product was present. The product was washed free of unreacted monomer in petroleum ether. The ether was evaporated off and a dried polyvinyl butyrate product weighing 6.3 g. was obtained.

EXAMPLE 75

To a sealed tube which had been baked in an oven and flushed with nitrogen was charged 9 cc. vinyl propionate, 1.8 millimoles of triethyl aluminum in n-heptane and 0.0082 millimole of oxygen. The tube was shaking for 15 minutes. The tube contents were poured into a 2% aqueous HCl-petroleum ether solution to precipitate the polymer product. The product after overnight drying weighed 0.3086 g. equal to 3.8% conversion of the monomer reactant.

We claim:

1. The process of homopolymerizing a vinylidene monomer containing a $CH_2=C<$ group which comprises subjecting said monomer at a temperature in the range of minus 80 to plus 80° C., to a catalyst consisting essentially of a catalytic amount of oxygen and an aluminum alkyl compound of the formula

in which R is a member of the group consisting of hydrogen and an alkyl and R' is an alkyl, all of said alkyl groups containing 1 to 8 carbon atoms, the mole ratio of said oxygen to said aluminum alkyl compound being in the range 1:0.0001 to 10000.

2. The process of homopolymerizing vinyl esters of aliphatic carboxylic acids wherein the acids contain 1–18 carbon atoms which comprises subjecting said vinyl esters at a temperature in the range of minus 80 to plus 80° C., to a catalytic amount of oxygen and an aluminum alkyl compound of the formula

in which R is a member of the group consisting of hydrogen and an alkyl and R' is an alkyl, all of said alkyl groups containing 1 to 8 carbon atoms, the mole ratio of said oxygen to said aluminum alkyl compound being in the range 1:0.0001 to 10000.

3. The process of homopolymerizing alkyl esters of acrylic acid wherein the alkyl group contains 1–13 carbon atoms which comprises subjecting said esters of acrylic acid at a temperature in the range of minus 80 to plus 80° C., to a catalytic amount of oxygen and an aluminum alkyl compound of the formula

in which R is a member of the group consisting of hydrogen and an alkyl and R' is an alkyl, all of said alkyl groups containing 1 to 8 carbon atoms, the mole ratio of said oxygen to said aluminum alkyl compound being in the range 1:0.0001 to 10000.

4. The process of homopolymerizing alkyl esters of methacrylic acid wherein the alkyl group contains 1–18 carbon atoms, which comprises subjecting said esters of methacrylic acid at a temperature in the range of minus 80 to plus 80° C., to a catalytic amount of oxygen and an aluminum alkyl compound of the formula

in which R is a member of the group consisting of hydrogen and an alkyl and R' is an alkyl, all of said alkyl groups containing 1 to 8 carbon atoms, the mole ratio of said oxygen to said aluminum alkyl compound being in the range 1:0.0001 to 10000.

5. The process of homopolymerizing nitriles of the formula

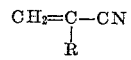

in which R is a member of the group consisting of hydrogen and methyl which comprises subjecting said nitriles at a temperature in the range of minus 80 to plus 80° C., to a catalytic amount of oxygen and an aluminum alkyl compound of the formula

in which R is a member of the group consisting of hydrogen and an alkyl and R' is an alkyl, all of said alkyl groups containing 1 to 8 carbon atoms, the mole ratio of said oxygen to said aluminum alkyl compound being in the range 1:0.0001 to 10000.

6. The process of homopolymerizing six membered carbocyclic compounds containing 1 to 3 ethylenically unsaturated groups of the formula

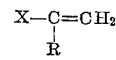

in which X is a radical member of the group consisting of phenyl, and cyclohexenyl and R is a member of the group consisting of hydrogen and methyl which comprises subjecting said six membered carbocyclic vinyl compounds at a temperature in the range of minus 80 to plus 80° C., to a catalytic amount of oxygen and an aluminum alkyl compound of the formula

in which R is a member of the group consisting of hydrogen and an alkyl and R' is an alkyl, all of said alkyl groups containing 1 to 8 carbon atoms, the mole ratio of said oxygen to said aluminum alkyl compound being in the range 1:0.0001 to 10000.

7. The process of homopolymerizing a vinyl ether of the formula $R-O-CH=CH_2$ wherein R is a member of the group consisting of an haloalkyl and alkoxyalkalene, the alkyl and alkalene groups containing 1 to 2 carbon atoms which comprises subjecting said vinyl ether at a temperature in the range of minus 80 to plus 80° C., to a catalytic amount of oxygen and an aluminum alkyl compound of the formula

in which R is a member of the group consisting of hydrogen and an alkyl and R' is an alkyl, all of said alkyl groups containing 1 to 8 carbon atoms, the mole ratio of said oxygen to said aluminum alkyl compound being in the range 1:0.0001 to 10000.

8. The process of homopolymerizing a conjugated diene of the formula

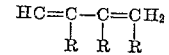

in which R is a member of the group consisting of hydrogen and methyl which comprises subjecting said conjugated diene at a temperature in the range of minus 80 to plus 80° C., to a catalytic amount of oxygen and an aluminum alkyl compound of the formula

in which R is a member of the group consisting of hydrogen and an alkyl and R' is an alkyl, all of said alkyl groups containing 1 to 8 carbon atoms, the mole ratio of said oxygen to said aluminum alkyl compound being in the range 1:0.0001 to 10000.

9. The process of homopolymerizing dimethylaminoethylmethacrylate monomer which comprises subjecting said monomer at a temperature in the range of minus 80 to plus 80° C., to a catalytic amount of oxygen and an aluminum alkyl compound of the formula

in which R is a member of the group consisting of hydrogen and an alkyl and R' is an alkyl, all of said alkyl groups containing 1 to 8 carbon atoms, the mole ratio of said oxygen to said aluminum alkyl compound being in the range 1:0.0001 to 10000.

References Cited in the file of this patent
UNITED STATES PATENTS

| | | |
|---|---|---|
| 2,129,664 | Barrett et al. | Sept. 13, 1938 |
| 2,699,457 | Ziegler et al. | Jan. 11, 1955 |
| 2,868,771 | Ray et al. | Jan. 13, 1959 |

UNITED STATES PATENT OFFICE
CERTIFICATE OF CORRECTION

Patent No. 3,117,112                                            January 7, 1964

Frank A. Mirabile et al.

It is hereby certified that error appears in the above numbered patent requiring correction and that the said Letters Patent should read as corrected below.

Column 1, line 53, for "insert" read -- inert --; column 10, line 24, for "100:1" read -- 1000:1 --; line 65, for "0.3086" read -- 7.4 --; same line 65, for "3.8%" read -- 31.7% --.

Signed and sealed this 9th day of June 1964.

(SEAL)
Attest:

ERNEST W. SWIDER                                         EDWARD J. BRENNER  
Attesting Officer                                            Commissioner of Patents